US009302546B2

(12) United States Patent
Faure et al.

(10) Patent No.: US 9,302,546 B2
(45) Date of Patent: *Apr. 5, 2016

(54) TIRE WITH IMPROVED TREAD

(75) Inventors: Jean-Claude Faure, Mozac (FR);
Emmanuel Igier, Aigueperse (FR);
Jean-Luc Mangeret, Riom (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 901 days.

This patent is subject to a terminal disclaimer.

(21) Appl. No.: 13/518,795

(22) PCT Filed: Dec. 17, 2010

(86) PCT No.: PCT/EP2010/070054
§ 371 (c)(1),
(2), (4) Date: Aug. 14, 2012

(87) PCT Pub. No.: WO2011/076680
PCT Pub. Date: Jun. 30, 2011

(65) Prior Publication Data
US 2012/0305156 A1 Dec. 6, 2012

Related U.S. Application Data

(60) Provisional application No. 61/317,846, filed on Mar. 26, 2010.

(30) Foreign Application Priority Data

Dec. 22, 2009 (FR) ........................ 09 59384

(51) Int. Cl.
*B60C 11/18* (2006.01)
*B60C 1/00* (2006.01)
(Continued)

(52) U.S. Cl.
CPC ........... *B60C 11/0058* (2013.04); *B60C 1/0016* (2013.04); *B60C 11/03* (2013.01); *B60C 11/0332* (2013.04); *B60C 2011/0025* (2013.04); *Y10T 152/10495* (2015.01)

(58) Field of Classification Search
CPC ........ B60C 1/00; B60C 1/0016; B60C 11/18; B60C 2001/0083; B60C 11/0008; B60C 11/0041; B60C 2011/0016; B60C 2011/0025; B60C 11/005; B60C 11/0058; B60C 11/0066; B60C 11/0075
USPC ........ 152/209.1, 209.5, 209.6, 209.8, 209.11, 152/450, 454–456, 905
See application file for complete search history.

(56) References Cited

U.S. PATENT DOCUMENTS 1,664,352 A * 3/1928 Coleman .................... 152/209.5
2,224,141 A * 12/1940 Clark ......................... 152/209.5
(Continued)

FOREIGN PATENT DOCUMENTS

EP 1 308 319 5/2003
EP 1 428 689 6/2004
(Continued)

*Primary Examiner* — Eric Hug
(74) *Attorney, Agent, or Firm* — Cozen O'Connor

(57) ABSTRACT

Tire (10) comprising a tread (40) having a mean radial height HB, an outer edge (45) and an inner edge (46), the axial distance between the outer edge (45) and the inner edge (46) defining the axial width L of the tread, the tread comprising a first portion (411) made of a first rubber compound, extending from the outer edge (45) to a first axial position at an axial distance from the outer edge of between 20% and 40% of the axial width; a second portion (412) made of a second rubber compound, extending from said first axial position to a second axial position at an axial distance from the outer edge of between 50% and 60% of the axial width L; a third portion (413) made of a third rubber compound extending from said second axial position to a third axial position at an axial distance from the outer edge of between 80% and 90% of the axial width L; and a fourth portion (414) made of a fourth rubber compound, extending from said third axial position to the inner edge (46) of the tread, wherein said first and third rubber compounds are predominantly filled with carbon black filler, wherein said second and fourth rubber compounds are predominantly filled with non carbon black filler, and wherein said first rubber compound and said third rubber compound have a value for tan δ at 0° C., at a stress of 0.7 MPa, that is lower than that of said second rubber compound and said fourth rubber compound.

5 Claims, 4 Drawing Sheets

(51) Int. Cl.
*B60C 11/00* (2006.01)
*B60C 11/03* (2006.01)

(56) References Cited

U.S. PATENT DOCUMENTS

| | | | |
|---|---|---|---|
| 4,319,620 A * | 3/1982 | Knill | 152/209.5 |
| 4,385,653 A * | 5/1983 | Okazaki et al. | 152/209.5 |
| 2004/0112490 A1* | 6/2004 | Sandstrom | 152/152.1 |
| 2004/0118495 A1* | 6/2004 | Sandstrom et al. | 152/209.5 |
| 2005/0045258 A1* | 3/2005 | Suzuki | 152/209.5 |
| 2005/0167019 A1* | 8/2005 | Puhala et al. | 152/209.5 |
| 2007/0017617 A1* | 1/2007 | Lafrique et al. | 152/209.5 |
| 2007/0137747 A1* | 6/2007 | Yoshida | 152/209.5 |
| 2007/0187013 A1* | 8/2007 | Losi et al. | 152/209.5 |
| 2007/0221303 A1* | 9/2007 | Sandstrom et al. | 152/209.5 |
| 2007/0295433 A1* | 12/2007 | Losi et al. | 152/209.5 |
| 2010/0132862 A1* | 6/2010 | Terada | 152/209.5 |
| 2011/0094639 A1* | 4/2011 | Daisho | 152/209.5 |
| 2012/0138203 A1* | 6/2012 | Kaes et al. | 152/450 |
| 2014/0150944 A1* | 6/2014 | Yamashita | 152/209.18 |

FOREIGN PATENT DOCUMENTS

| | | |
|---|---|---|
| EP | 1 431 078 | 6/2004 |
| JP | 60 094804 | 5/1985 |

* cited by examiner

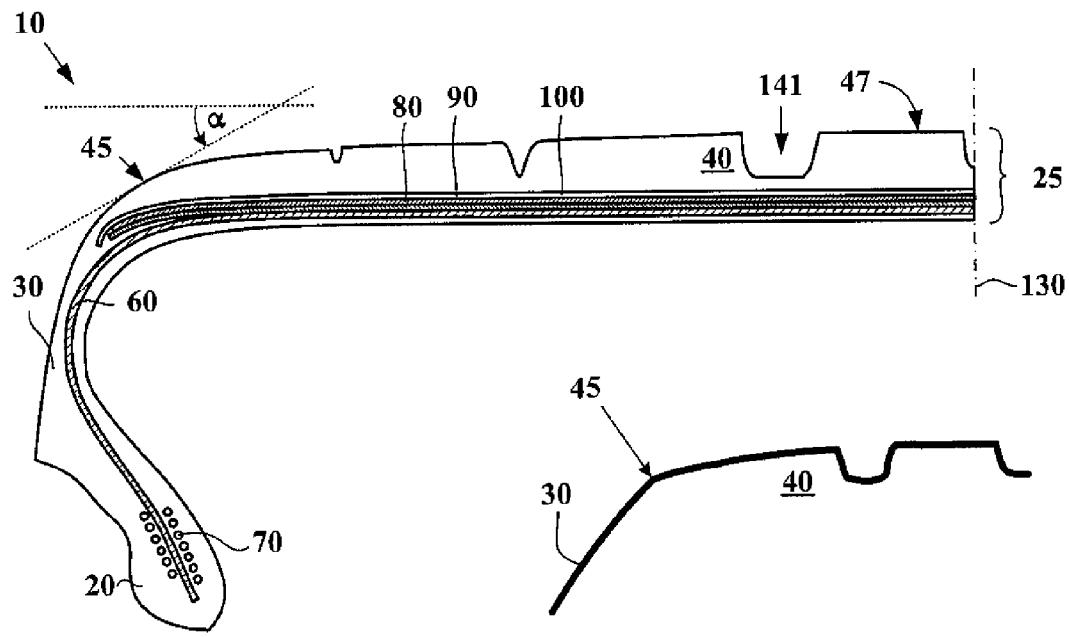
FIG. 3
(PRIOR ART)
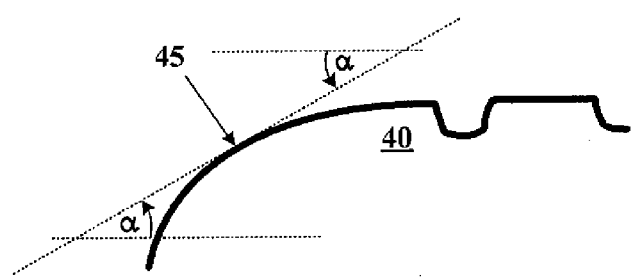
FIG. 4
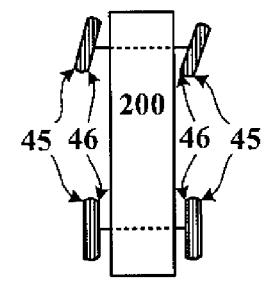
FIG. 6
FIG. 5
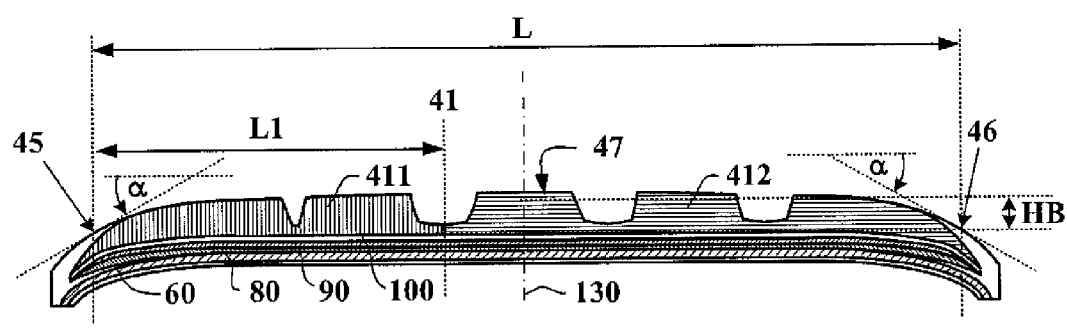
FIG. 7 (PRIOR ART)

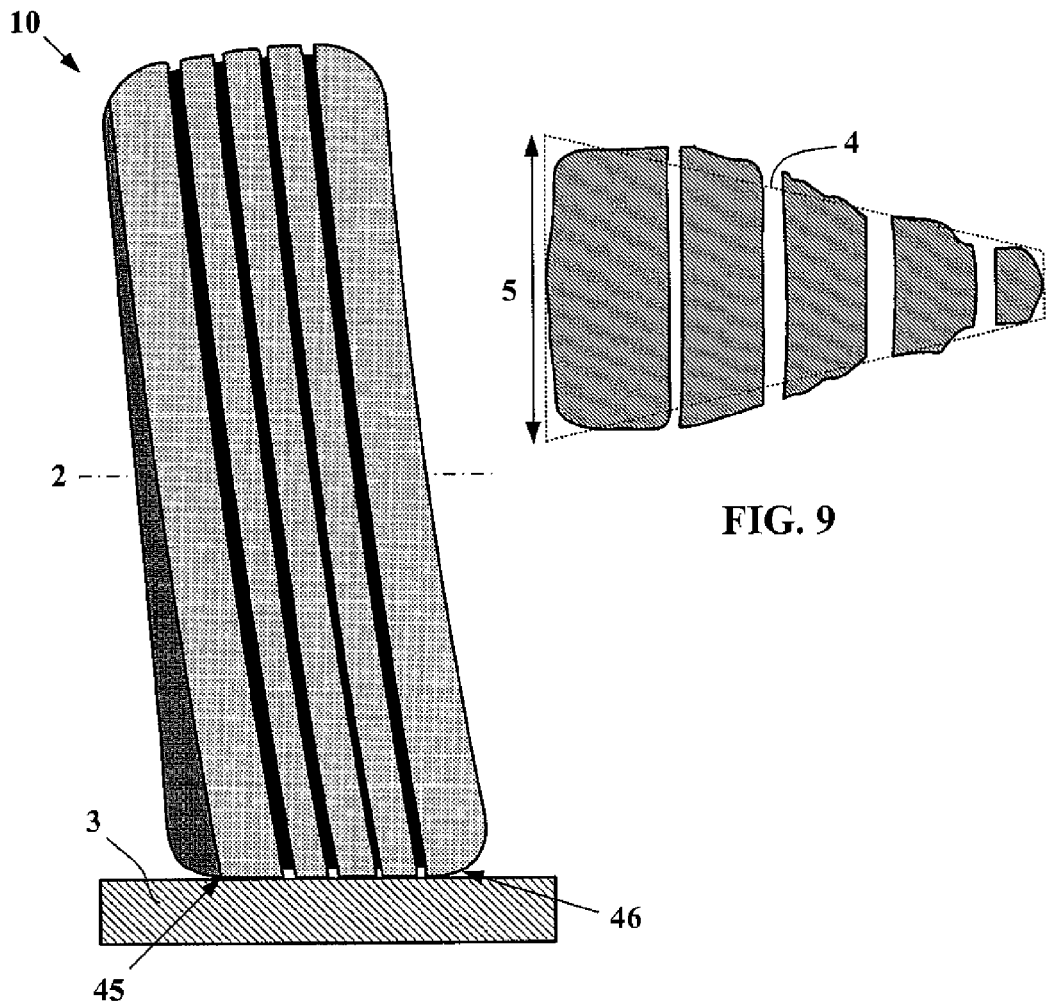
FIG. 8
FIG. 9
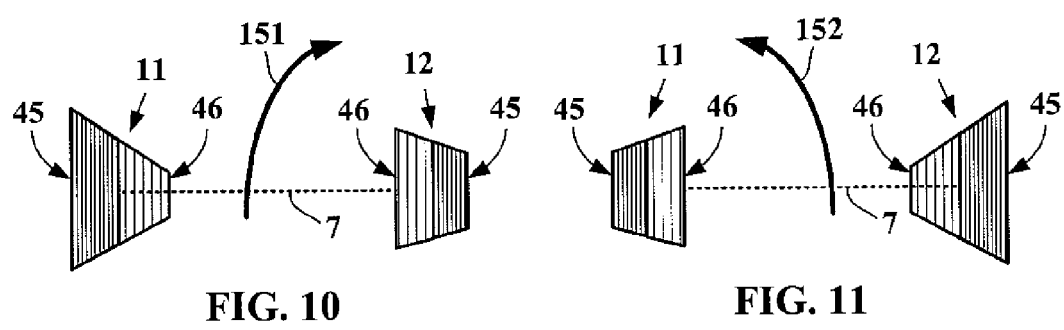
FIG. 10
FIG. 11

TIRE WITH IMPROVED TREAD

RELATED APPLICATIONS

This is a U.S. national stage of application No. PCT/EP2010/070054, filed on Dec. 17, 2010.

This application claims the priority of French application Ser. No. 09/59384 filed on Dec. 22, 2009 and U.S. Provisional Application No. 61/317,846 filed on Mar. 26, 2010, the contents of both of which are hereby incorporated by reference.

FIELD OF THE INVENTION

The present invention relates to tires for passenger vehicles. It relates more particularly to tires suited to sporty road driving.

BACKGROUND

The grip that tires have on the ground on which they are rolling is one of the most important features from the point of view of the safety of the driver of a vehicle fitted with tires. It is also of key importance in determining the performance of the vehicle in sporty road driving. If its tires lose their ability to steer as a result of a lack of grip, the vehicle can no longer be steered.

Of course, a vehicle, even if designed for sporty use, has to be driven in variable weather conditions. It is, therefore, a known practice for the tire to be provided with means that provide good grip on dry ground and on wet ground. In particular, it is possible to adapt at least part of the tread pattern to use on wet ground, for example by providing recesses able to drain away and/or to store water, or by increasing the number of tread pattern edges able to cut through the film of water formed between the tread and the ground. It is also possible to vary the materials of which the tread is made, using rubber compounds more particularly suited to use on wet ground and/or on dry ground. A tread comprising the two types of rubber compound is able to achieve good grip under all circumstances. An example of such a tire is given in document EP 1 308 319.

Under sporty road driving conditions, the tires of a vehicle experience substantial transverse stresses when the vehicle fitted with the tires is cornering. During the corner, the transverse stresses cause, on the contact area where each tire makes contact with the ground on which it is rolling, deformation resulting in a substantially trapezoidal shape. The side of the contact area which is furthest away from the center of the bend lengthens, while the side of the contact area closest to the center of the bend shortens.

The "side of the contact area furthest from the center of the bend" is the side via which the elements of the tread come into contact with the ground in the direction of the rate of drift of the center of the wheel on which the tire is mounted. For this reason, it is sometimes referred to as "(transverse) leading edge". The opposite side, that is to say the "side of the contact area closest to the center of the bend" is sometimes referred to as the "(transverse) trailing edge".

This "trapezoidal" deformation alters both the load borne by the various ribs of the tread and the contribution that each makes to the transverse force developed by the tire. For a given load that the tires of the vehicle have to support in a given cornering situation, the ribs that have become lengthened bear a greater share of the total load borne by the tire. The ribs which have shortened bear a correspondingly lower proportion of the total load borne by the tire. For a given transverse force, delivered by one of the tires in a given cornering situation, it follows that the most heavily loaded ribs (in general, those on the side furthest from the center of the bend) are those which make the greatest contribution to the total transverse force.

Rubber compounds suited for use on wet ground are generally more fragile with respect to the very high thermal and mechanical stresses generated in the contact area of a tire under severe cornering conditions on a dry road surface. If the tread of the tire is provided with portions made of a rubber compound with better grip on dry ground and with portions made of a rubber compound with better grip on wet ground, then it is preferable to ensure that the rubber compound that has better grip on dry ground is placed on the side of the contact area that is furthest from the center of the bend. Thus, even if the contact area becomes trapezoidal, the tire will maintain good grip on dry ground, that is to say a good ability to develop a high transverse force. Further, because the ground contact pressures are higher on this same side of the contact area (which is the furthest from the center of the bend), the drainage of the water with which the road surface is wetted is generally rather satisfactory in this part of the contact area. As a consequence, conditions that establish good grip contact and that allow use of a rubber compound with better grip on dry ground are created in this region of the tread. In other words, the tire, in this region, behaves as if it were rolling on dry ground. There is therefore no need to provide in this part of the tread a rubber compound that has better grip on wet ground and of which the performance on dry ground is inferior than that of a rubber compound that has better grip on dry ground. The "Pilot Sport 2" tire commercialized by Michelin is an example of a tire that has such a distribution of rubber compounds within its tread.

In spite of the good performance offered by this tire in terms of grip, there is still an increasing need to improve the compromise between grip on dry ground and grip on wet ground of tires, and more particularly of tires designed for sporty road driving.

SUMMARY OF THE INVENTION

One of the objectives of the present invention is, therefore, to provide a tire that provides a better compromise between grip on dry ground and grip on wet ground.

This objective is achieved using a tire that has a predetermined direction of mounting, in which a portion of that part of the tread that is traditionally reserved for the rubber compounds that have better grip on wet ground is made of a rubber compound that has better grip on dry ground. In other words, a portion of that part of the tread that is situated on that side of the vehicle which faces toward the vehicle when the tire is mounted on the vehicle in said predetermined direction of mounting (that is to say on the "inside" of the tire; the corresponding sidewall commonly bearing the inscription "inside" and/or the opposite sidewall commonly bearing the inscription "outside") is made of a rubber compound that has better grip on dry ground.

More specifically, the objective is achieved using a tire designed to be mounted on a mounting rim of a wheel of a vehicle and having a predetermined direction of mounting on the vehicle, comprising a tread having a mean radial height HB, comprising a rolling surface designed to come into contact with a ground when the tire is rolling on the ground, the tread having an outer edge and an inner edge, the outer edge being situated on that side of the tire which, when the tire is mounted on the vehicle in said predetermined direction of mounting, faces toward the outside of the vehicle, the inner edge being situated on that side of the tire which, when the tire is mounted on the vehicle in said predetermined direction of mounting, faces toward the vehicle, the axial distance between the outer edge and the inner edge defining the axial width L of the tread.

The tread comprises a first portion made of at least one first rubber compound, the first portion extending, in any radial section, from the outer edge to a first axial position, the axial distance of the first axial position from the outer edge being greater or equal to 20% and smaller or equal than 40% of the axial width L of the tread.

The tread also comprises a second portion made of at least one second rubber compound, the second portion extending, in any radial section, from said first axial position to a second axial position, the axial distance of the second axial position from the outer edge being greater or equal to 50% and smaller or equal than 60% of the axial width L of the tread.

The tread also comprises a third portion made of at least one third rubber compound, the third portion extending, in any radial section, from said second axial position to a third axial position, the axial distance of the third axial position from the outer edge being greater or equal to 80% and smaller or equal than 90% of the axial width L of the tread.

Finally, the tread comprises a fourth portion made of at least one fourth rubber compound, the fourth portion extending, in any radial section, from said third axial position to the inner edge of the tread.

Said first, second, third and fourth portions extend over the entire circumference of the tire and have an intersection with the rolling surface when the tire is new or, at the latest, after at most 10% of the height HB has been worn away, Said at least one first rubber compound and said at least one third rubber compound contain at least one elastomer and at least one reinforcing filler containing a carbon black, the carbon black representing a percentage PN1 greater than or equal to 50% and less than or equal to 100% of the weight of all of the reinforcing filler, and wherein said at least one second rubber compound and said at least one fourth rubber compound contain at least one elastomer and at least one reinforcing filler, possibly including a carbon black, the carbon black representing a percentage PN2 greater than or equal to 0% and less than or equal to 50% of the weight of all of the reinforcing filler.

Said at least one first rubber compound and said at least one third rubber compound have a value for tan δ at 0° C., at a stress of 0.7 MPa, that is lower (preferably lower by at least 0.05) than that of said at least one second rubber compound and said at least one fourth rubber compound.

According to one advantageous embodiment, said portions made of said at least one first, second, third and fourth rubber compounds all have an intersection with the rolling surface when the tire is new. Thus, the tire is able to develop its full potential right from first use.

According to another advantageous embodiment, said at least one third rubber compound is identical to said at least one first rubber compound and said at least one fourth rubber compound is identical to said at least one second rubber compound. This embodiment has the notable advantage of simplifying the manufacture of the tire and the control of stocks of rubber compound at the factory.

According to a third advantageous embodiment, said at least one first rubber compound and said at least one third rubber compound have a value for tan δ at 10° C., at a stress of 0.7 MPa, that is higher (preferably higher by at least 0.05) than that of said at least one second rubber compound and said at least one fourth rubber compound. As a matter of fact, the value tan δ of the rubber compound at 10° C., at a stress of 0.7 MPa, neatly characterizes the grip on dry ground.

According to another advantageous embodiment, the difference between the value of tan δ for said at least one first rubber compound and said at least one second rubber compound is greater than or equal to 0.05, wherein the difference between the value of tan δ for said at least one second rubber compound and said at least one third rubber compound is greater than or equal to 0.05, and wherein the difference between the value of tan δ for said at least one third rubber compound and said at least one fourth rubber compound is also greater than or equal to 0.05. This applies to both the tan δ values at 0° C. and the tan δ values at 10° C., as the case may be.

Of course, it is possible, and even desirable to combine two or more of the embodiments described.

BRIEF DESCRIPTION OF THE DRAWINGS

FIG. 3 depicts, in radial cross section, a quarter of a tire according to the prior art.

FIGS. 4 and 5 illustrate how the axial edge of a tread is determined.

FIG. 6 illustrates the terms "inner edge" and "outer edge" of a tread.

FIG. 7 schematically depicts the crown of a tire according to the prior art.

FIG. 8 schematically depicts the deformation of a tire according to the prior art when it experiences substantial transverse stresses.

FIG. 9 illustrates the trapezoidal distortion of the contact area of such a tire.

FIGS. 10 and 11 illustrate the trapezoidal distortion of the contact area of two tires mounted on one and the same axle of a vehicle, depending on the direction in which the vehicle is cornering.

DETAILED DESCRIPTION OF THE DRAWINGS

When using the term "radial" it is appropriate to make a distinction between various different uses that the person skilled in the art makes of this word. Firstly, the expression refers to a radius of the tire. It is in that sense that a point P1 is said to be "radially inside" a point P2 (or "radially on the inside of" the point P2) if it is closer to the axis of rotation of the tire than is the point P2. Conversely, a point P3 is said to be "radially outside" a point P4 (or "radially on the outside of" the point P4) if it is further from the axis of rotation of the tire than is the point P4. Progress "radially inward (or outward)" will mean progress toward smaller (or larger) radii. In terms of radial distances, it is this sense of the word that applies also.

By contrast, a thread or a reinforcement is said to be "radial" when the thread or the reinforcing elements of the reinforcement make an angle greater than or equal to 80° and less than or equal to 90° with the circumferential direction. Let us specify that in this document, the term "thread" is to be understood in a very general sense of the word and encompasses threads in the form of monofilaments, multifilaments, a cord, a yarn or an equivalent assembly, irrespective of the material of which the thread is made or of the surface treatment it has undergone to enhance its bonding with the rubber.

Finally, a "radial cross section" or "radial section" here means a cross section or a section on a plane which contains the axis of rotation of the tire.

An "axial" direction is a direction parallel to the axis of rotation of the tire. A point P5 is said to be "axially inside" a point P6 (or "axially on the inside of" the point P6) if it is closer to the median plane of the tire than is the point P6. Conversely, a point P7 is said to be "axially outside" a point P8 (or "axially on the outside of" the point P8) if it is further from the median plane of the tire than is the point P8. The "median plane" of the tire is the plane which is perpendicular to the axis of rotation of the tire and which lies equal distances from the annular reinforcing structures of each bead.

A "circumferential" direction is a direction perpendicular both to a radius of the tire and to the axial direction. A "circumferential section" is a section on a plane perpendicular to the axis of rotation of the tire.

Two reinforcing elements are said to be "parallel" in this document when the angle formed between the two elements is less than or equal to 20°.

What is meant here by "rolling surface" is all the points on the tread of a tire that come into contact with the ground when the tire is rolling.

The expression "rubber compound" denotes a compound of rubber containing at least one elastomer and one filler.

To make the description of the variants shown with the figures easier to read, the same references are used to denote elements that have identical structures.

Figure 1:
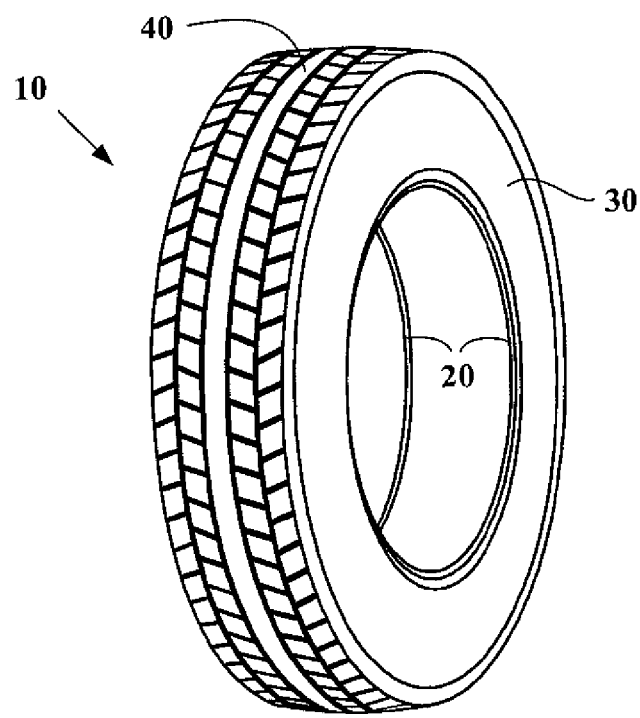
FIG. 1 depicts a tire according to the prior art.

FIG. 1 schematically depicts a tire 10 according to the prior art. The tire 10 comprises a crown comprising a crown reinforcement (not visible in FIG. 1) surmounted by a tread 40, two sidewalls 30 extending the crown radially inward, and two beads 20 radially inside of the sidewalls 30.

Figure 2:
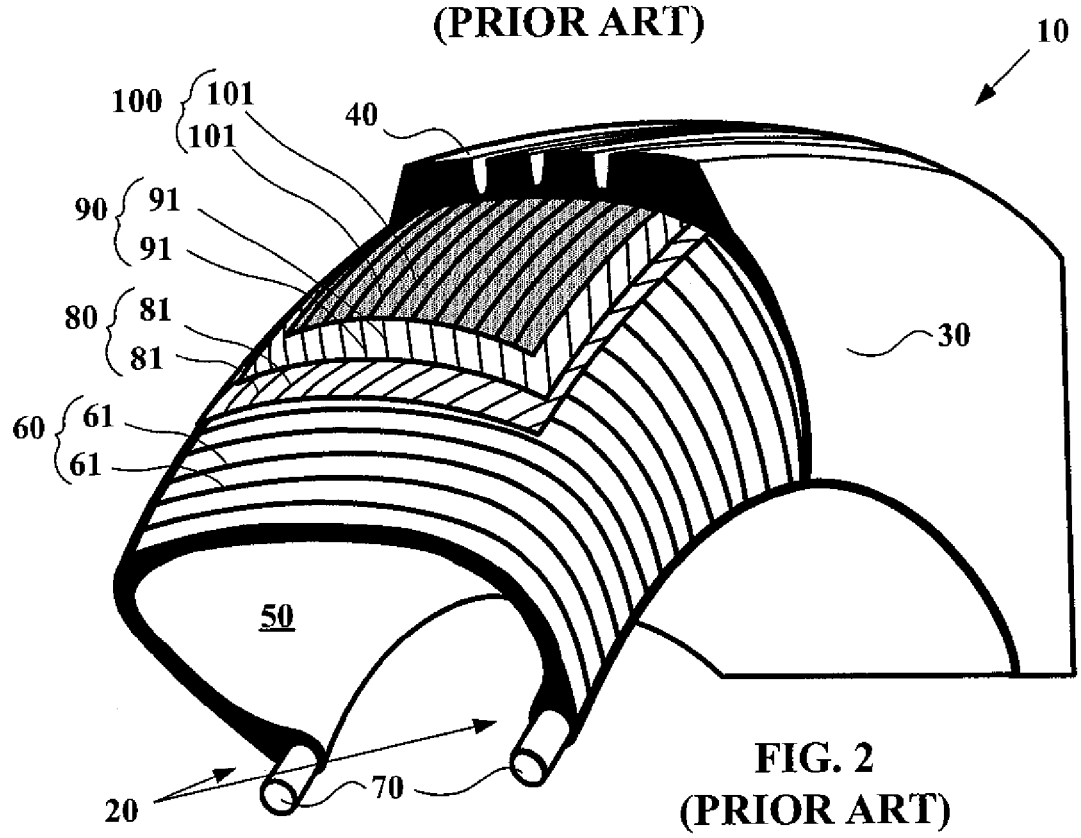
FIG. 2 depicts a partial perspective view of a tire according to the prior art.

FIG. 2 schematically depicts a partial perspective view of a tire 10 according to the prior art and illustrates the various components of the tire. The tire 10 comprises a carcass reinforcement 60 made up of threads 61 coated with rubber compound, and two beads 20 each comprising annular reinforcing structures 70 which hold the tire 10 on the rim (not depicted). The carcass reinforcement 60 is anchored in each of the beads 20. The tire 10 further comprises a crown reinforcement comprising two plies 80 and 90. Each of the plies 80 and 90 is reinforced with thread-like reinforcing elements 81 and 91 which are parallel within each layer and cross from one layer to the next, making angles ranging between 10° and 70° with the circumferential direction. The tire further comprises a hooping reinforcement 100, arranged radially on the outside of the crown reinforcement, this hooping reinforcement being formed of circumferentially directed spiral-wound reinforcing elements 101. A tread 40 is laid on the hooping reinforcement; it is this tread 40 that provides contact between the tire 10 and the road surface. The tire 10 depicted is a "tubeless" tire: it comprises an "inner liner" 50 made of a rubber compound impervious to the inflation gas, covering the interior surface of the tire.

FIG. 3 schematically depicts, in radial cross section, one quarter of a reference tire 10 of the "Pilot Sport 2" type commercialized by Michelin. The tire 10 comprises two beads 20 designed to come into contact with a mounting rim (not depicted), each bead 20 comprising a plurality of annular reinforcing structures 70. Two sidewalls 30 extend the beads 20 radially outward and meet in a crown 25 comprising a crown reinforcement formed of a first layer of reinforcing elements 80 and of a second layer of reinforcing elements 90, and radially surmounted by a hooping reinforcement 100, which is itself radially surmounted by a tread 40. The median plane 130 of the tire is also indicated.

The way in which the axial edges of a tread are determined is illustrated in FIGS. 4 and 5 each of which shows the profile of a portion of the tread 40 and of that part of the sidewall 30 that is adjacent to it. In some tire designs, the transition from tread to sidewall is clear-cut, as in the case depicted in FIG. 4, and determining the axial edge 45 of the tread 40 is straightforward. However, there are tire designs in which the transition between tread and sidewall is continuous. An example is given in FIG. 5. The edge of the tread is then determined as follows. The tangent to the rolling surface of the tire at any point on the rolling surface in the region of transition toward the sidewall is drawn onto a radial cross section of the tire. The axial edge is the point at which the angle α (alpha) between said tangent and an axial direction is equal to 30°. When there are several points at which the angle α (alpha) between said tangent and an axial direction is equal to 30°, it is the radially outmost point that is adopted. In the case of the tire depicted in FIG. 3, the axial edge 45 has been determined in this way.

Each layer of reinforcing elements 80 and 90 comprises thread-like reinforcing elements, coated in a matrix formed of rubber compound. The reinforcing elements of each layer are substantially mutually parallel; the reinforcing elements of the two layers cross from one layer to the next at an angle of about 20°, as is well known to those skilled in the art for tires known as radial tires.

The tire 10 further comprises a carcass reinforcement 60 which extends from the beads 20 through the sidewalls 30 as far as the crown 25. This carcass reinforcement 60 here comprises thread-like reinforcing elements that are directed substantially radially, that is to say that make an angle greater than or equal to 80° and less than or equal to 90° with the circumferential direction.

The carcass reinforcement 60 comprises a plurality of carcass reinforcing elements; it is anchored in the two beads 20 between the annular reinforcing structures 70.

FIG. 7 schematically depicts the crown of a tire according to the prior art, designed to be mounted on a mounting rim of a wheel of a vehicle and having a predetermined direction of mounting on the vehicle. This crown notably comprises a tread having a mean radial height HB. The tread comprises a rolling surface 47 designed to come into contact with the ground when the tire is rolling on the ground.

The tread has an outer edge 45 and an inner edge 46, the outer edge 45 being situated on that side of the tire which, when the tire is mounted on the vehicle in said predetermined direction of mounting, faces toward the outside of the vehicle (see FIG. 6), the inner edge 46 being situated on that side of the tire which, when the tire is mounted on the vehicle in said predetermined direction of mounting, faces toward the vehicle (see FIG. 6). The axial distance between the outer edge 45 and the inner edge 46 defines the axial width L of the tread, The tread comprises a first portion 411 made of a first rubber compound. The first portion 411 extends, in any radial section, from the outer edge 45 to a first axial position 41, the axial distance L1 of the first axial position from the outer edge 45 being equal to 40% of the axial width L of the tread. The first portion 411 extends around the entire circumference of the tire and has an intersection with the rolling surface when the tire is new (unworn).

The tread also comprises a second portion 412 made of a second rubber compound. The second portion 412 extends, in any radial section, from said first axial position 41 to the inner edge 46 of the tread, The second rubber compound has a grip on wet ground that is superior to the grip on wet ground of the first rubber compound and a grip on dry ground that is inferior to the grip on dry ground of the first rubber compound. This portion extends over the entire circumference of the tire and has an intersection with the rolling surface when the tire is new (unworn).

FIGS. 8 and 9 schematically depict the deformation of a tire 10 according to the prior art, inflated to 3 bar and heavily loaded (load of 7100 N) when it experiences substantial transverse stresses (camber: −4.4°, rate of sideslip: 3 m/s). FIG. 8 corresponds to a view in the direction of forward travel of the tire. The reference 2 indicates the axis of rotation of the tire 10 and the reference 3 the ground on which the tire 10 is rolling.

FIG. 9 depicts the footprint of the tire 10 on the ground 3. To a first approximation, this footprint is in the shape of a trapezium 4 the long side 5 of which is the side furthest from the center of the bend being taken by the vehicle on which the tire 10 is mounted. Because the grip of the tire is greater on dry ground than on wet ground, the transverse forces that the tire may experience are also greater on dry ground and the trapezoidal deformation is more pronounced. It is, therefore, advantageous to ensure that the portion of rubber compound with better grip on dry ground is on that side of the contact area that is furthest from the center of the bend, as is the case in the tire depicted in FIG. 7. By providing a portion made of rubber compound with better grip on wet ground on that side of the contact area that is closest to the center of the bend, an advantageous compromise can be reached between the grip of the tire on dry ground and on wet ground.

In defining a tire according to the invention, a distinction has been made between that side of the tire which, when the tire is mounted on the vehicle in its predetermined direction of mounting, faces toward the outside of the vehicle, and that side of the tire that faces toward the vehicle when the tire is mounted on the vehicle in its predetermined direction of mounting. In the previous paragraph, by contrast, the physical effects have been explained with reference to the sides furthest from and closest to the center of the bend. Of course, these distinctions do not correspond to one another, because reference to the center of the bend depends on the direction of the bend (whether the vehicle is cornering to the left or to the right) whereas the side facing toward the outside of the vehicle and the side facing in toward the vehicle do not depend on this. This apparent difficulty may be explained using FIGS. 10 and 11.

FIG. 10 illustrates the trapezoidal deformation of the contact area of two tires 11 and 12 mounted on one and the same axle 7 of a vehicle, viewed upward from the ground on which the tires are rolling. The case being considered is a left-hand bend (when considered from the point of view of the driver of the vehicle), that is to say a bend in the direction indicated using the arrow 151. The tires 11 and 12 have been mounted in their predetermined directions of mounting: the inner edges 46 of their treads are on the side facing in toward the body of the vehicle (the body is not depicted), and the outer edges 45 facing toward the outside of the vehicle. Strictly speaking, the situation is optimized only for the tire 11 because the rubber compound with better grip on dry ground, which is on the outer edge 45 side, is on the side furthest from the center of the bend. By contrast, for the tire 12, the rubber compound with better grip on dry ground is on the side closest to the center of the bend. As has been depicted in FIG. 11, the situation reverses when the driver corners to the right (from his point of view) that is to say in the direction indicated using the arrow 152. In FIG. 11 it is the tire 12 that is best suited. Whatever the direction of the bend, there is always one tire that "does not suit". Because an ordinary vehicle corners as often to the left as to the right, it is none the less preferable to favor the tire that is on the side furthest from the center of the bend, because it is that tire which bears more load and has the greater contact area. It is that tire which, therefore, plays a dominant part in the overall grip of the vehicle. Therefore, such an arrangement corresponds to an advantageous compromise for vehicles that corner as often to the right as to the left. In the infrequent case of a vehicle that turns always in the same direction (for example a vehicle that is exclusively used to cover a circular circuit in just one direction), it would be possible to optimize the mounting of the tires to ensure that the rubber compound with the better grip on dry ground is always on the side furthest from the center of the bend.

An embodiment of the invention provides a way to improve the overall grip performance still further and, more particularly, to improve the compromise between grip on dry ground and grip on wet ground. This objective is achieved using a tire that has a predetermined direction of mounting, in which a portion of that part of the tread that is traditionally reserved for the rubber compounds that have better grip on wet ground is made of a rubber compound that has better grip on dry ground. In other words, a portion of that part of the tread that is situated on that side of the vehicle which faces toward the vehicle when the tire is mounted on the vehicle in the predetermined direction of mounting (that is to say on the "inside" of the tire; the corresponding sidewall commonly bearing the inscription "inside" and/or the opposite sidewall commonly bearing the inscription "outside") is made of a rubber compound that has better grip on dry ground.

Figure 12:
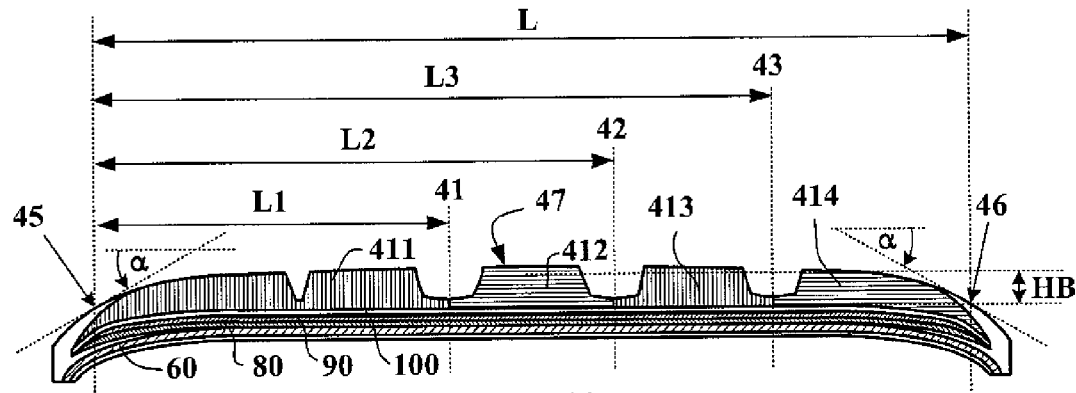
FIGS. 12 to 14 schematically depict the crown of a tire according to an embodiment of the invention.

FIG. 12 schematically depicts the crown of a tire according to an embodiment of the invention. This crown notably comprises a tread of axial width L and mean radial height HB. The tread comprises a rolling surface 47 designed to make contact with the ground when the tire is rolling on the ground.

The tread has an outer edge 45 and an inner edge 46, the outer edge being situated on that side of the tire which, when the tire is mounted on the vehicle in said predetermined direction of mounting, faces toward the outside of the vehicle (see FIG. 6), the inner edge being situated on that side of the tire which, when the tire is mounted on the vehicle in said predetermined direction of mounting, faces toward the vehicle (see FIG. 6). What has been said above on the determination of the exact position of the outer edge 45 and the inner edge 46 also applies to a tire according to an embodiment of the invention. The axial distance between the outer edge 45 and the inner edge 46 defining the axial width L of the tread.

The tread comprises a first portion 411 made of a first rubber compound, the first portion extending, in any radial section, from the outer edge 45 to a first axial position 41. The axial distance L1 of the first axial position 41 from the outer edge 45 is equal to 40% of the axial width L of the tread, The first rubber compound is a compound that has good grip on dry ground: it contains at least one elastomer and at least one reinforcing filler containing a carbon black, the carbon black representing a percentage PN1 greater than or equal to 50% and less than or equal to 100% of the weight of all of the reinforcing filler.

The tread comprises a second portion 412 made of a second rubber compound, the second portion 412 extending, in any radial section, from said first axial position 41 to a second axial position 42. The axial distance L2 of the second axial position 42 from the outer edge 45 is equal to 60% of the axial width L of the tread, The second rubber compound has a grip on wet ground that is superior to the grip on wet ground of the first rubber compound: it contains at least one elastomer and at least one reinforcing filler, possibly including a carbon black, the carbon black representing a percentage PN2 greater than or equal to 0% and less than or equal to 50% of the weight of all of the reinforcing filler.

The tread also comprises a third portion 413 made of a third rubber compound, the third portion 413 extending, in any radial section, from said second axial position 42 to a third axial position 43. The axial distance L3 of the second axial position 43 from the outer edge 45 is equal to 80% of the axial width L of the tread. The third rubber compound contains at least one elastomer and at least one reinforcing filler containing a carbon black, the carbon black representing a percentage PN1 greater than or equal to 50% and less than or equal to 100% of the weight of all of the reinforcing filler. In the present embodiment, the first and third rubber compounds have the same composition, which is advantageous from the manufacturing point of view. None the less, it is possible to have a third rubber compound that differs from the first rubber compound.

Finally, the tread also comprises a fourth portion 414 made of a fourth rubber compound, the fourth portion 414 extending, in any radial section, from said third axial position 43 to the inner edge 46 of the tread. The fourth rubber compound has a grip on wet ground that is superior to the grip on wet ground of the first rubber compound: it contains at least one elastomer and at least one reinforcing filler, possibly including a carbon black, the carbon black representing a percentage PN2 greater than or equal to 0% and less than or equal to 50% of the weight of all of the reinforcing filler. In the present embodiment, the second and fourth rubber compounds have the same composition, which is advantageous from the manufacturing point of view. None the less, it is possible to have a fourth rubber compound that differs from the second rubber compound.

Said first, second, third and fourth portions extend over the entire circumference of the tire and have an intersection with the rolling surface 47 when the tire is new (unworn).

The first and third rubber compound have a value for tan δ at 0° C., at a stress of 0.7 MPa, that is lower than that of the second and fourth rubber compounds.

Figure 13:
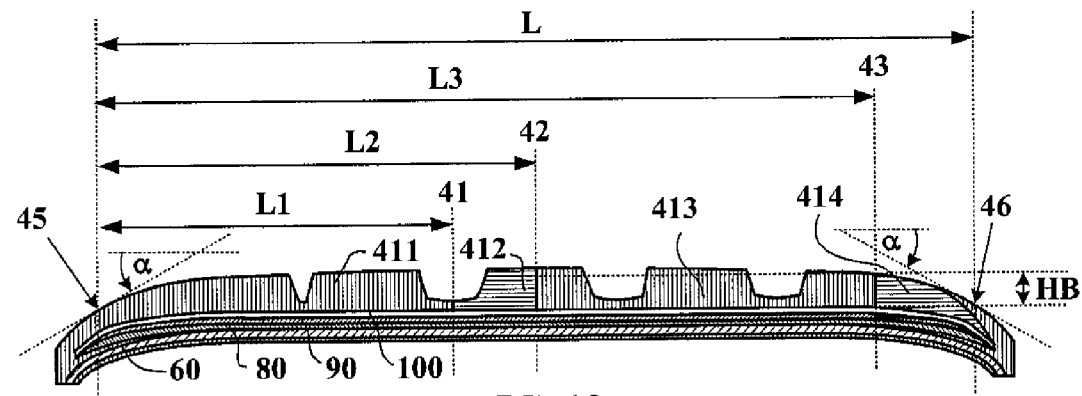

FIG. 13 schematically depicts the crown of a tire according to another embodiment of the invention. Unlike the case of the tire depicted in FIG. 12, the axial distance L2 of the second axial position 42 from the outer edge 45 is equal to 50% of the axial width L of the tread and the axial distance L3 of the third axial position 43 from the outer edge 45 is equal to 90% of the axial width L. This figure also illustrates that in a tire according to an embodiment of the invention, the transitions between the various compounds do not necessarily lie at a circumferential groove.

Figure 14:
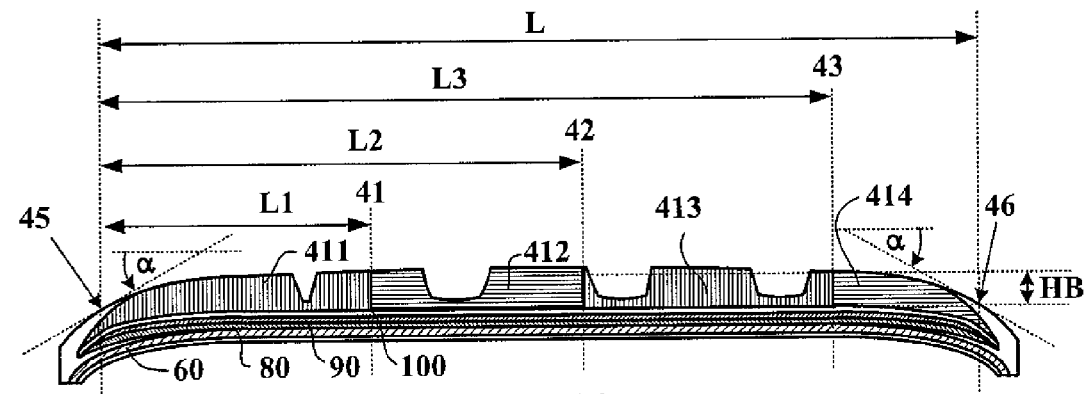

FIG. 14 schematically depicts the crown of a tire according to another embodiment of the invention. Here, the axial distance L1 of the first axial position 41 from the outer edge 45 is equal to 30% of the axial width L, the axial distance L2 of the second axial position 42 from the outer edge 45 is equal to 55% of the axial width L, and the axial distance L3 of the third axial position 43 from the outer edge 45 is equal to 85% of the axial width L.

Table 1 gives, by way of example, the composition of rubber compounds that can be used. The composition is given in pce ("percent elastomer") that is to say in parts by weight for 100 parts by weight of elastomer.

TABLE I

|  | Compound with better grip on dry ground | Compound with better grip on wet ground |
| --- | --- | --- |
| SBR Elastomer [1] | 100 | 100 |
| N 234 [2] | 100 | — |
| Silica | — | 100 |
| TESPT coupling agent (Degussa Si 69) | — | 8.0 |
| Plasticizer [3] | 50 | 50 |
| Anti-ozone wax C32 ST | 1.5 | 1.5 |
| Antioxidant (6PPD) [4] | 2.0 | 2.0 |
| Diphenylguanidine (DPG) | — | 1.7 |
| ZnO | 1.8 | 1.8 |
| Stearic acid | 2.0 | 2.0 |
| Sulfur | 1.3 | 1.3 |
| Accelerator (CBS) | 1.95 | 1.95 |

Notes for Table I:
[1] SSBR with 40% styrene, 48% 1-4 trans polybutadiene groups
[2] Carbon black series 230 (ASTM)
[3] TDAE ("treated distillate aromatic extract") oil
[4] N-(1,3-dimethylbutyl)-N'-phenyl-p-phenylenediamine The rubber compounds are preferably based on at least one diene elastomer, one reinforcing filler and a crosslinking system.

What is meant by a "diene" elastomer (or interchangeably rubber) is, in the known way, an elastomer derived at least in part from (i.e. a homopolymer or a copolymer of) diene monomers, that is to say monomers bearing two carbon-carbon double bonds, conjugated or otherwise. The diene elastomer used is preferably chosen from the group consisting of polybutadienes (BR), natural rubber (NR), synthetic polyisoprenes (IR), styrene butadiene copolymers (SBR), isoprene-butadiene copolymers (BIR), isoprene-styrene copolymers (SIR), butadiene-styrene-isoprene copolymers (SBIR) and blends of these elastomers.

One preferred embodiment is to use an "isoprene" elastomer, that is to say a homopolymer or copolymer of isoprene, or in other words, a diene elastomer chosen from the group consisting of natural rubber (NR), synthetic polyisoprenes (IR), the various copolymers of isoprene and blends of these elastomers.

The isoprene elastomer is preferably natural rubber or a synthetic polyisoprene of the cis-1,4 type. Of these synthetic polyisoprenes, use is preferably made of polyisoprenes that have a cis-1,4 bond content (mol %) in excess of 90%, or more preferably still, in excess of 98%. According to other preferred embodiments, the diene elastomer may consist, in full or in part, of another diene elastomer such as, for example, an SBR (E-SBR or S-SBR) elastomer used in combination or otherwise with another elastomer for example of the BR type.

The rubber composition may also contain all or some of the additives conventionally employed in the rubber matrices used for the manufacture of tires, such as, for example, reinforcing fillers such as carbon black or inorganic fillers such silica, coupling agents for inorganic fillers, anti-aging agents, antioxidants, plasticizers or extender oils, whether the latter are of aromatic or non-aromatic nature (notably oils that are only very slightly aromatic or non-aromatic, for example of the naphthene or paraffin type, with a high or preferably low viscosity, MES or TDAE oils, plasticizing resins with a high $T_g$ in excess of 30° C.), agents that improve the processability of the compositions in the green state, tackifying resins, a crosslinking system based either on sulfur or sulfur donors and/or peroxides, accelerators, vulcanization activators or retarders, anti-reversion agents, methylene acceptors and donors such as, for example, HMT (hexamethylenetetramine) or H3M (hexamethoxymethylmelamine), reinforcing resins (such as resorcinol or bismaleimide), known adhesion promoting systems of the metal salt type, for example, notably cobalt or nickel salts.

The compositions are manufactured in appropriate mills, using two successive phases of preparation well known to those skilled in the art, namely a first phase of thermomechanical work or kneading (the so-called "non-productive" phase) at high temperature, up to a maximum temperature of between 110° C. and 190° C., preferably between 130° C. and 180° C., followed by a second phase of mechanical work (the so-called "productive" phase) down to a lower temperature, typically of less than 110° C., during which finishing stage the crosslinking system is incorporated.

By way of example, the non-productive phase is conducted in a single thermomechanical step lasting a few minutes (for example between 2 and 10 min) during which all the required basic ingredients and other additives, apart from the crosslinking or vulcanizing system, are introduced into an appropriate mixer such as a conventional internal mixer. Once the compound thus obtained has cooled, the vulcanizing system is then incorporated with it in an external mixer such as an open mill kept at a low temperature (for example between 30° C. and 100° C.). This is then blended (productive phase) for a few minutes (for example for between 5 and 15 min).

Vulcanizing (or curing) may be performed in the known way at a temperature generally between 130° C. and 200° C., preferably under pressure, for a sufficient length of time which may vary, for example, between 5 and 90 min depending in particular on the curing temperature, on the vulcanizing system adopted and on the vulcanization dynamics of the composition considered.

Table II gives the properties of the rubber compounds the composition of which is given in Table I

TABLE II

|  | Compound with better grip on dry ground | Compound with better grip on wet ground |
|---|---|---|
| tan δ at 0° C., at 0.7 MPa | 0.76 | 0.88 |
| tan δ at 10° C., at 0.7 MPa | 0.69 | 0.58 |

These properties are measured with a viscoanalyser (Metravib VA4000), in accordance with standard ASTM D 5992-96. The response of a test specimen of vulcanized composition (a cylindrical test specimen 4 mm thick and 400 mm² in section) subjected to simple alternating sinusoidal shear stresses at a frequency of 10 Hz, during a temperature sweep between 0° and 100° C., under a fixed stress of 0.7 MPa, is recorded, particularly the value of tan δ observed at 0° C. and the values of tan δ observed at 10° C.

It will be recalled that, as is well known to those skilled in the art, the value of tan δ at 0° C. is representative of the potential to grip on wet ground: the higher tan δ at 0° C., the better the grip. The values of tan δ at temperatures higher than 10° C. are representative of the hysteresis of the material and of the potential to grip on dry ground.

To return to the compounds the composition of which is given in Table I, it may be seen that the second composition has a value of tan δ at 0° C. (imposed stress 0.7 MPa) that is higher by comparison with the first composition, indicating that its grip on wet ground will be superior; and has a value of tan δ at 10° C. that is lower by comparison with the first composition, indicating that the grip on dry ground would be inferior.

Tests were carried out using a Porsche 997 fitted with Pilot Super Sport tires, size 245/35 R20 (on the front) and 295/30 R20 (on the rear). A tire equipped with a tread as depicted in FIG. 12 was compared against a reference tire equipped with a tread as depicted in FIG. 7. The rubber compounds of Table I were used. The tires according to the invention saved an average of 1 second per lap (on the Nardo (Italy) "handling" circuit with a circuit length of 6.2 km) on dry ground, at the expense of just 0.2 seconds per lap on wet ground. These improved times were backed by the subjective assessment of the drivers who reported better grip on dry ground and substantially unchanged grip on wet ground. The invention therefore provides a better compromise between grip on dry ground and grip on wet ground.

The invention claimed is:

1. A tire designed to be mounted on a mounting rim of a wheel of a vehicle and having a predetermined direction of mounting on the vehicle, comprising:

a tread having a mean radial height HB, comprising a rolling surface designed to come into contact with a ground when the tire is rolling on the ground, the tread having an outer edge and an inner edge, the outer edge being situated on that side of the tire which, when the tire is mounted on the vehicle in said predetermined direction of mounting, faces toward the outside of the vehicle, the inner edge being situated on that side of the tire which, when the tire is mounted on the vehicle in said predetermined direction of mounting, faces toward the vehicle, the axial distance between the outer edge and the inner edge defining the axial width L of the tread, the tread comprising a first portion made of at least one first rubber compound, the first portion extending, in any radial section, from the outer edge to a first axial position, the axial distance of the first axial position from the outer edge being greater or equal to 20% and smaller or equal than 40% of the axial width L of the tread, the tread comprising a second portion made of at least one second rubber compound, the second portion extending, in any radial section, from said first axial position to a second axial position, the axial distance of the second axial position from the outer edge being greater or equal to 50% and smaller or equal than 60% of the axial width L of the tread, the tread comprising a third portion made of at least one third rubber compound, the third portion extending, in any radial section, from said second axial position to a third axial position, the axial distance of the third axial position from the outer edge being greater or equal to 80% and smaller or equal than 90% of the axial width L of the tread, the tread comprising a fourth portion made of at least one fourth rubber compound, the fourth portion extending, in any radial section, from said third axial position to the inner edge of the tread, wherein said first, second, third and fourth portions extend over the entire circumference of the tire and have an intersection with the rolling surface when the tire is new or, at the latest, after at most 10% of the height HB has been worn away, wherein said at least one first rubber compound and said at least one third rubber compound contain at least one elastomer and at least one reinforcing filler containing a carbon black, the carbon black representing a percentage PN1 greater than or equal to 50% and less than or equal to 100% of the weight of all of the reinforcing filler, and wherein said at least one second rubber compound and said at least one fourth rubber compound contain at least one elastomer and at least one reinforcing filler, including a carbon black, the carbon black representing a percentage PN2 less than or equal to 50% of the weight of all of the reinforcing filler, and wherein said at least one first rubber compound and said at least one third rubber compound have a value for tan δ at 0° C., at a stress of 0.7 MPa, that is lower than that of said at least one second rubber compound and said at least one fourth rubber compound.

2. The tire of claim 1, wherein said portions made of said at least one first, second, third and fourth rubber compounds all have an intersection with the rolling surface when the tire is new.

3. The tire of claim 1, wherein said at least one third rubber compound is identical to said at least one first rubber compound and wherein said at least one fourth rubber compound is identical to said at least one second rubber compound.

4. The tire of claim 1, wherein said at least one first rubber compound and said at least one third rubber compound have a value for tan δ at 10° C., at a stress of 0.7 MPa, that is higher than that of said at least one second rubber compound and said at least one fourth rubber compound.

5. The tire of claim 1, wherein the difference between the value of tan δ for said at least one first rubber compound and said at least one second rubber compound is greater than or equal to 0.05, wherein the difference between the value of tan δ for said at least one second rubber compound and said at least one third rubber compound is greater than or equal to 0.05, and wherein the difference between the value of tan δ for said at least one third rubber compound and said at least one fourth rubber compound is greater than or equal to 0.05.

* * * * *